United States Patent [19]

Murai

[11] Patent Number: 4,672,325
[45] Date of Patent: Jun. 9, 1987

[54] CLOCK FREQUENCY DETECTION CIRCUIT

[75] Inventor: Masao Murai, Tokyo, Japan

[73] Assignee: NEC Corporation, Japan

[21] Appl. No.: 638,051

[22] Filed: Aug. 6, 1984

[30] Foreign Application Priority Data

Aug. 9, 1983 [JP] Japan .................................. 58-145354

[51] Int. Cl.[4] .......................... H03K 9/06; H03K 5/00
[52] U.S. Cl. ................................... 328/138; 328/120;
328/140; 307/228; 307/522; 307/234
[58] Field of Search ..................... 328/120, 138, 140;
307/227, 228, 527, 518, 234, 522, 358, 360

[56] References Cited

U.S. PATENT DOCUMENTS

3,864,583  2/1975  Fiorino ................................ 307/518
4,322,642  3/1982  Sugasawa ........................... 328/138
4,353,091  10/1982  Hoppe ................................ 307/234

Primary Examiner—S. D. Miller
Assistant Examiner—Timothy P. Callahan
Attorney, Agent, or Firm—Laff, Whitesel, Conte & Saret

[57] ABSTRACT

A clock detector has a D flip-flop having a D terminal, a reset terminal and a clock terminal, a first saw-tooth wave signal generator having a first time constant for supplying to the D terminal a first logic signal resulting from a first saw-tooth wave signal, and a second saw-tooth wave signal generator having a second time constant which is larger than the first time constant for supplying to the reset terminal a second logic signal resulting from a second saw-tooth wave signal. A first clock pulse is supplied to the first and second saw-tooth wave signal generators, and a second clock pulse is applied to the clock terminal of the D flip-flop. When a reciprocal of a frequency of the first and second clock pulses falls within the first and second time constants, a normal clock pulse is detected.

5 Claims, 29 Drawing Figures

CLOCK FREQUENCY DETECTION CIRCUIT

BACKGROUND OF THE INVENTION

The present invention relates to a clock detector for detection of a faulty clock in a digital circuit Various types of faulty clock detection techniques in digital cirucits have hitherto been proposed. However, conventional clock detectors are limited to detection of the presence/absence of a clock signal. For example, according to a conventional clock detection scheme, the presence/absence of clocks is detected by detecting the presence/absence of an output signal from a digital circuit. Another conventional clock detection scheme utilizes retriggering by means of a one-shot multivibrator in order to detect a succeeding pulse which occurs a predetermined time after a preceeding pulse. However, these conventional methods cannot detect an abnormal change in clock frequency.

SUMMARY OF THE INVENTION

It is an object of the present invention to provide a clock detector for quickly and easily detecting an abnormal change in a frequency of clocks generated from a clock generator in a digital circuit.

According to the present invention, a pair of time constant circuits having different time constants and a D flip-flop are used to detect that normal clocks are produced only when a reciprocal of a clock rate falls within the range defined between the different time constants.

According to an aspect of the present invention, there is provided a clock detector comprising a D flip-flop and first and second saw-tooth wave generators. The D flip-flop has a D terminal(data terminal), a reset terminal and a clock terminal. The first saw-tooth wave generator having a first time constant supplies a first saw-tooth wave signal which is referenced to a threshold to provide a logic signal at the D terminal. The second saw-tooth wave generator having a second time constant larger than the first time constant supplies a second saw-tooth wave signal which is referenced to the threshold to provide a logic signal at the reset terminal. According to the present invention, clock pulses are supplied to the clock terminal and the first and second saw-tooth wave generators. When a reciprocal of a frequency of the clock signal falls within the range between the first and second time constants, the clock detector detects that the clocks are normal.

DESCRIPTION OF THE DRAWINGS

FIGS. 3A to 3H and FIGS. 4A to 4H are timing charts of signals at the main parts of the clock detector shown in FIG. 1 when the frequencies of clock signals are excessively high and low, respectively;

DETAILED DESCRIPTION OF THE PREFERRED EMBODIMENT

Figure 1:
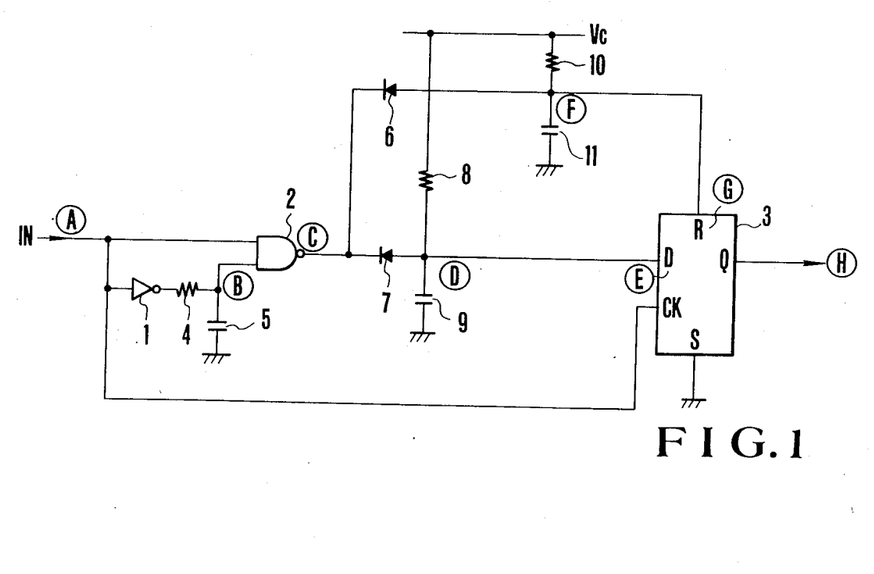
FIG. 1 is a circuit diagram of a clock detector according to an embodiment of the present invention.

FIG. 1 is a circuit diagram of a clock detector according to an embodiment of the present invention. Referring to FIG. 1, an input terminal of an inverter 1 is connected to an input terminal IN, and an output terminal of the inverter 1 is connected to one end of a resistor 4. The other end of the resistor 4 is connected to one end of a capacitor 5, and the other end of which is grounded. The one end of the capacitor 5 is also connected to one input terminal of a NAND gate 2. The other input terminal of the NAND gate 2 is connected to the input terminal IN. The output terminal of the NAND gate 2 is connected to cathodes of diodes 6 and 7. The anode 6 is connected to a reset terminal R of a D flip-flop 3 through a common node between one end of a resistor 10 and one end of a capacitor 11. The other end of the resistor 10 is connected to a power supply terminal Vc, and the other end of the capacitor 11 is grounded. The anode of the diode 7 is connected to a terminal D of the D flip-flop 3 through a common node between one end of a resistor 8 and one end of a capacitor 9. The other end of the resistor 8 is connected to the power supply terminal Vc, and the other end of the capacitor 9 is grounded. A clock terminal CK of the flip-flop 3 is connected to the input terminal IN. It should be noted that a set terminal S of the D flip-flop 3 is grounded.

The resistor 4 and the capacitor 5 constitute a differentiator serving as a delay circuit. The resistor 8 and the capacitor 9 constitute a first saw-tooth wave generator having a first time constant and the resistor 10 and the capacitor 11 constitute a second saw-tooth wave generator having a second time constant.

The operation of the clock detector shown in FIG. 1 will be described with reference to FIG. 1 to FIG. 4H.

A clock input to the input terminal IN is supplied to the input terminal of the inverter 1 and the other input terminal of the NAND gate 2. An output from the inverter 1 is supplied to the delay circuit. An output from the NAND gate 2 is supplied to a first saw-tooth wave generator comprising the diode 7, the resistor 8 and the capacitor 9 and to a second saw-tooth wave geneator comprising the diode 6, the resistor 10 and the capacitor 11. Outputs from the first and second saw-tooth wave generators are supplied to the terminal D and the reset terminal R of the D flip-flop 3, respectively. Reference symbols Ⓐ, Ⓑ, Ⓒ, Ⓓ, Ⓔ, Ⓕ, Ⓖ and Ⓗ in FIG. 1 denote waveform check points.

Figure 2A:
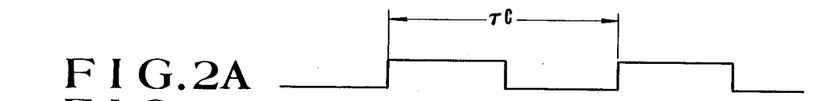
FIGS. 2A to 2H are timing charts of signals at the main parts of the clock detector shown in FIG. 1 when a frequency of a clock signal is normal.
Figure 2B:
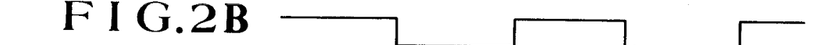
Figure 2C:
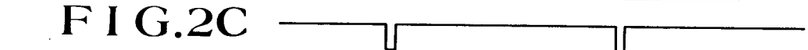

FIGS. 2A to 2H show signals at waveform check points. FIGS. 2A to 2H correspond to Ⓐ to Ⓗ in FIG. 1. The clock rate of a clock shown in FIG. 2A is determined in the following manner. A reciprocal $\tau c$ of the clock rate falls within the range between first and second time constants $\tau 1$ and $\tau 2$, where the first time constant $\tau 1$ determined by the resistor 8 and the capacitor 9 is smaller than the second time constant $\tau 2$ determined by the resistor 10 and the capacitor 11. In this case, the clock detector detects as a normal clock the clock having the rate falling within the above range.

Figures 2D, 2E:
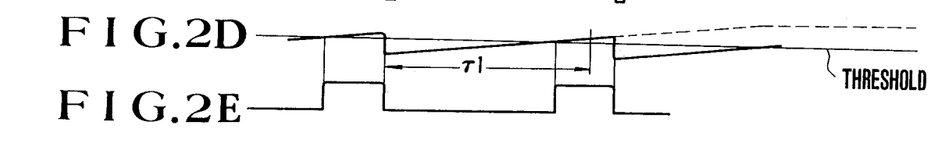
Figure 2F:
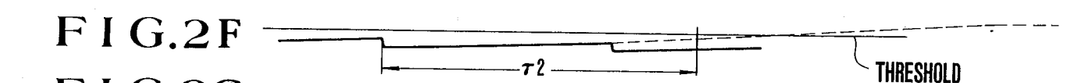

Dotted curves in FIGS. 2D and 2F illustrate predictive charging curves at the time constants τ1 and τ2.

More particularly, a clock signal shown in FIG. 2A is inverted by the inverter 1, and an inverted clock signal is delayed by the delay circuit comprising the resistor 4 and the capacitor 5. A delayed clock signal (FIG. 2B) is supplied to the one input terminal of the NAND gate 2. The NAND gate 2 generates negative pulses (FIG. 2C) synchronized with the rising edges of the clock pulses (FIG. 2A). In response to the negative pulse, electric charge stored in the capacitor 9 is instanteously discharged through the diode 7 and a grounding path (not shown) formed in the NAND gate 2 and thereafter, the capacitor 9 is charged from the terminal Vc through the resistor 8 as shown in FIG. 2D starting from the rising edge of the negative pulse. The waveform shown in FIG. 2E represents whether the logic level of the signal supplied to the terminal D of the flip-flop 3 is set at level "1" or "0" in response to the above saw-tooth wave signal of FIG. 2D. This logic signal of FIG. 2E corresponds to a logic signal determined by whether or not the input applied to the D flip-flop 3 exceeds the internal threshold of the flip-flop 3.

The D flip-flop 3 comprises, for example, a dual D-type flip-flop μPD4013BC manufactured and sold by NEC Corporation in Japan. The logic signal supplied to the terminal D is written while the clock pulse shown in FIG. 2A is set at low level. When the clock pulse goes high, the flip-flop 3 generates an output. When the set and reset terminals S and R are kept high, the set/reset operation of the flip-flop 3 can be performed independently of clock inputs. The truth table of the μPD4013BC is shown below.

| Input | | | | Output |
|---|---|---|---|---|
| Clock | Data | Set | Reset | Qn + 1 |
| ⟋ | L | L | L | L |
| ⟋ | H | L | L | H |
| ⟍ | x | L | L | Qn |
| x | x | L | H | L |
| x | x | H | L | H |
| x | x | H | H | H |

Figure 2G:
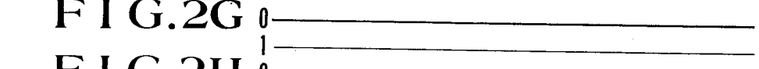
Figure 2H:
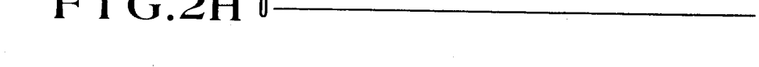

H: high level
L: low level
x: H or L
Qn: output before the clock pulse is supplied
Qn + 1: output after the clock pulse is supplied In the flip-flop 3 shown in FIG. 1, the signal at the terminal D (FIG. 2E) is at logic "1" at the rising edge of the next clock pulse. Therefore, when the clock is supplied to the clock terminal CK of the flip-flop 3, the signal of logic "1" is sampled and latched by the flip-flop 3. The same operation as described above is performed for the second time constant. However, since the second time constant is larger than the first time constant, a voltage (FIG. 2F) will not be higher than that in the case of the first time constant. Thus, as a result of the signal of FIG. 2F referenced to the threshold in the flip-flop 3, a logic signal as shown in FIG. 2G is obtained. As is apparent from the waveform shown in FIG. 2G, the logic signal is set at logic "0", so the flip-flop 3 will not be reset. Therefore, a signal appearing at the output terminal Q is set at logic "1", as shown in FIG. 2H. In this manner, the clock is detected as normal by the clock detector.

FIGS. 3A to 3H show waveforms of signals for explaining clock detection when a frequency of the clock signal is abnormally increased. The signals shown in FIGS. 3A to 3H appear at the waveform check points to Ⓐ to Ⓗ in the same manner as in FIGS. 2A to 2H, respectively.

Figure 3A:
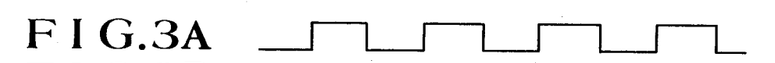
Figure 3B:
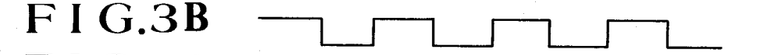
Figure 3C:
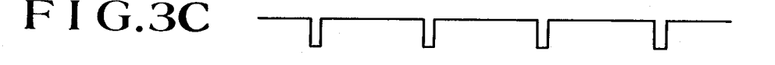
Figure 3D:
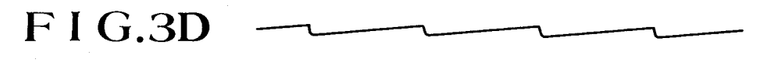
Figure 3E:
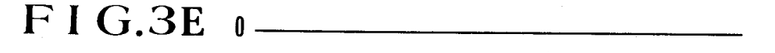
Figure 3F:
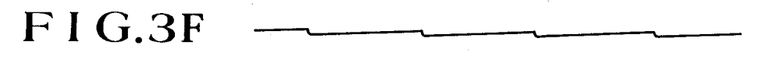
Figure 3G:
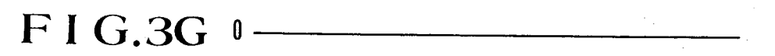
Figure 3H:
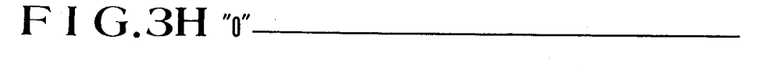

Since the clock signal has a short period, a voltage level of a saw-tooth wave signal shown in FIG. 3D is low, and thus a logic signal shown in FIG. 3E is kept at logic "0". This signal of logic "0" is sampled and latched in response to the clock pulses (See truth table set forth previously). A voltage level of a signal shown in FIG. 3F is lower than that of the signal shown in FIG. 2F. Therefore, a signal shown in FIG. 3H is kept at logic "0", and an abnormal clock signal is detected.

Figure 4A:
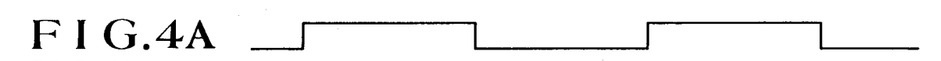
Figure 4B:
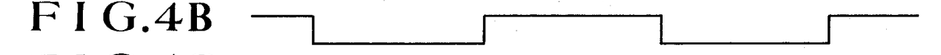
Figure 4C:
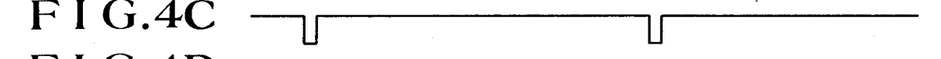
Figure 4D:
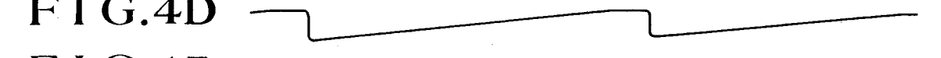
Figure 4E:
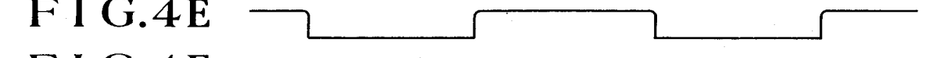
Figures 4F, 4G:
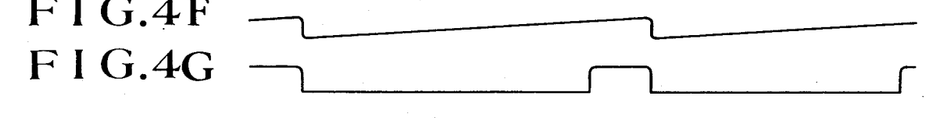

FIGS. 4A to 4H show waveforms of signals for explaining clock detection when a frequency of the clock signal is abnormally decreased. The signals shown in FIGS. 4A to 4H appear at the waveform check points Ⓐ to Ⓗ in the same manner as in FIGS. 2A to 2H, respectively. Since the clock signal has a long period, a voltage level of a saw-tooth wave signal shown in FIG. 4D becomes sufficiently high. A logic signal shown in FIG. 4E is kept at logic "1" in response to the next rising edge of the clock pulse. A voltage level of a signal shown in FIG. 4F is higher than that of the signal shown in FIG. 2F. A logic signal shown in FIG. 4G is set at logic "1" at the rising edge of the clock pulse. Therefore, the D flip-flop 3 samples a pulse of logic "1" in response to the rising edge of the clock pulse. In this state, the flip-flop 3 can be reset. When the flip-flop 3 is actually reset, the signal shown in FIG. 4H is set in logic "0". In this case, an abnormal clock pulse is detected.

When the clock is stopped, the signal appearing at the point Ⓐ is fixed at logic "1" or "0". When this signal is fixed at logic "0", the signal appearing at the point Ⓒ becomes logic "1" through the NAND gate 2. When the signal at the point is set at logic "1", the signal appearing at the point Ⓑ is set at logic "0", and thus the signal appearing at the point Ⓒ is also set at logic "1". Therefore, the voltage level at the point Ⓕ becmes the same as the power supply voltage Vcc. Therefore, the signal at the point Ⓖ becomes logic "1" (See truth table set forth previously), and the D flip-flop 3 is reset. For this reason, the signal at the point Ⓗ is set at logic "0", and thus an abnormal clock signal is detected.

As has been described above, the signal appearing at the point Ⓗ is set at logic "1" only when an inverse number τc of clock rate of the input pulses appearing at the point Ⓐ falls within the range between the first time constant τ1 and the second time constant τ2.

According to the present invention, the clock detector comprises a pair of time constant circuits having differenct time constants and one D flip-flop and detects that a clock is normal only when the reciprocal of the clock rate falls within the range between the first time constant and the second time constant, therefore any abnormality occurring in the clock generator in a digital circuit can be easily and quickly detected.

The clock detector according to the present invention can be used in a variety of applications. Examples of applications of the clock detector will be described with reference to FIGS. 5A to 7.

Figure 5A:
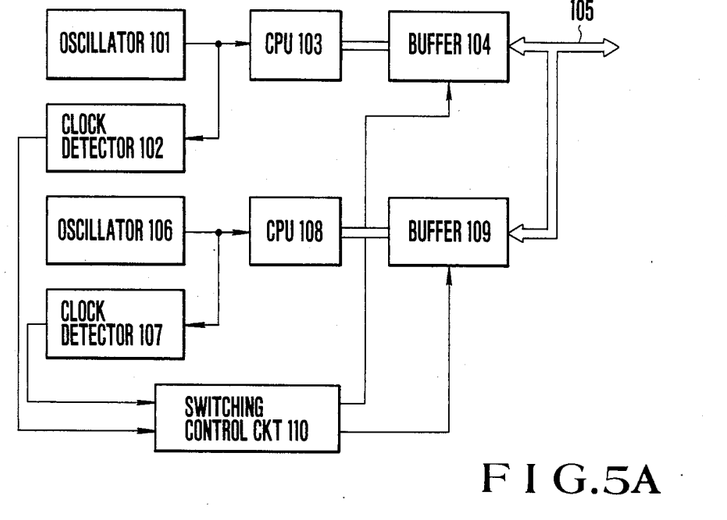
FIG. 5A is a block diagram of a CPU clock detection system to which the clock detector of the present invention is applied.

FIG. 5A shows a CPU clock detection system using the clock detectors of the present invention. Referring to FIG. 5A, a clock pulse generated from a quartz oscillator 101 connected to a CPU board 103 is supplied to a common bus 105 through a bus buffer 104. The quartz oscillator 101, the clock detector 102 and the CPU board 103 constitute a main unit. Similarly, a quartz oscillator 106, a clock detector 107 and a CPU board 108 constitute a supplementary unit. A signal from the CPU board 108 is supplied to the common bus 105 through a bus buffer 109. A switching control circuit 110 switches one of the bus buffers 104 and 109 through a gate so as to supply data to the common bus 105.

Assume that the main unit is selected by the switching control circuit 110 and the bus buffer 104 is operated. When an abnormality occurs in the quartz oscillator 101 while the CPU board 103 is connected to the common bus 105 through the bus buffer 104, the clock detector 102 detects a failure of the quartz oscillator 101, and an alarm signal is supplied to the switching control cirucit 110. When the switching control circuit 110 receives the alarm signal from the main unit, the circuit 110 deenergizes the bus buffer 104 and energizes the bus buffer 109 so as to connect the CPU board 108 to the common bus 105. As a result, the supplementary unit is started and the reliability of the circuit connected to the common bus can be improved.

Figure 5B:
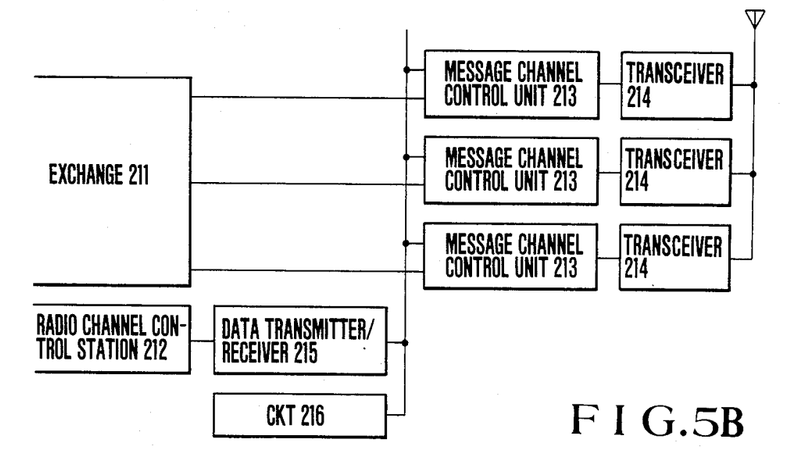
FIG. 5B is a block diagram of a mobile radiotelephone exchange to which the CPU clock detection system of FIG. 5A is applied.

FIG. 5B shows a base station of a mobile radiotelephone system using the circuit shown in FIG. 5A. Reference numeral 216 denotes the circuit arrangement shown in FIG. 5A. The common bus from the circuit 216 is connected to voice or message channel control units 213 and a data transmitter/receiver unit 215. Reference numeral 211 denotes a mobile radiotelephone exchange. The message channels of the exchange 211 are connected to the transceiver unit 214 through the corresponding channel control units 213. Reference numeral 212 denotes a radio channel control station connected to the data transmitter/receiver unit 215 to control the radio base station.

Figure 6:
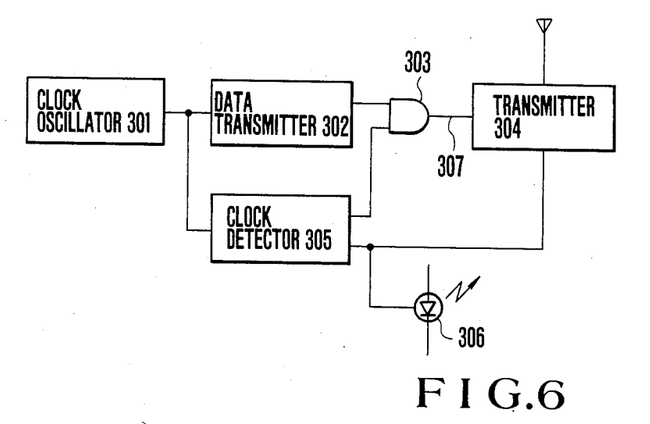
FIG. 6 is a block diagram of a data communication clock detection system to which the clock detector of the present invention is applied.

FIG. 6 shows a data transmission detection system using the clock detector according to the present invention. Referring to FIG. 6, a clock oscillator 301 oscillates and gives an output clock pulse train for a data circuit. A data transmitter unit 302 is connected to a transmitter 304 through a gate 303 via a data line 307. A clock detector 305 monitors the clock pulses generated from the quartz oscillator 301. When an abnormality of the quartz oscillator 301 is detected by the clock detector 305, the gate 303 is disabled to prevent the abnormal data from being supplied to the data line 307. An indicator 306 is turned on when an abnormality is detected by the clock detector 305, and the transmitter 304 is disabled to prevent an abnormal wave from being transmitted. Therefore, the reliability of the data network can be improved, and the transmission of undesired waves can be prevented.

Figure 7:
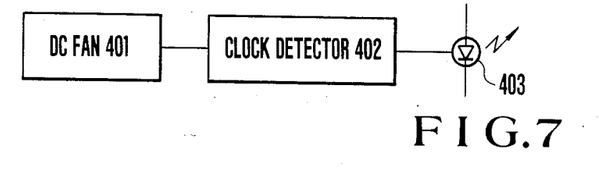
FIG. 7 is a block diagram of a DC fan rotational frequency detection system to which the clock detector of the present invention is applied.

FIG. 7 shows a fan rotation detection system using the clock detector according to the present invention. Referring to FIG. 7, a DC fan 401 generates one pulse per revolution. The pulse from the DC fan 401 is checked by a clock detector 402. When irregular rotation is detected by the clock detector 402, an indicator 403 is turned on to signify a signal abnormality. Therefore, a simple fan alarm system is provided.

What is claimed is:

1. A clock detector comprising:
   first saw-tooth-wave signal generating means having a first time for receiving a first clock pulse and for generating a first saw-tooth wave signal;
   second saw-tooth wave signal generating means having a second time constant which is larger than the first time constant for receiving the first clock pulse and for generating a second saw-tooth wave signal;
   latching means for receiving the first saw-tooth wave signal as a data signal, the second saw-tooth wave signal as a reset signal, said latching means having a terminal for receiving an input clock pulse as a clock signal, and for generating an output signal when a period of a signal of the input clock pulse falls within a range between the first time constant and the second time constant;
   an inverter for receiving and inverting the input clock pulse to produce an inverted clock pulse;
   a differentiator comprising a resistor and a capcitor for delaying the inverted clock pulse to produce a delayed pulse; and
   a NAND gate for receiving an input clock pulse and the delayed pulse from said differentiator to produce the first clock pulse, said NAND gate supplying the first clock pulse to said first and second saw-tooth signal generating menas.

2. A clock detector comprising:
   first saw-tooth wave signal generating means having a first time constant for receiving a first pulse signal having a negative going pulse which is generated in response to a leading edge of an input clock pulse signal and for generating a first saw-tooth wave signal;
   second saw-tooth wave signal generating means having a second time constant which is larger then the first time constant for receiving the firsr pulse signal and for generating a second saw-tooth wave signal; and
   latching means for receiving the first saw-tooth wave signal, the second saw-tooth wave signal, and the input clock pulse signal, and for generating an output signal indicating that period of the input clock pulse signal which falls within a range between the first time constant and the second time constant.

3. A clock detector according to claim 2, wherein said first saw-tooth wave signal generating means comprises a first time constant circuit including a resistor and a capacitor which are connected in series with each other and the resulting series circuit is connected between a power supply terminal and ground; and a diode having an anode connected to a common node between said resistor and said capacitor and having a cathode coupled to receive the first clock pulse signal, said common node being connected to a terminal of said latching means for receiving the first saw-tooth wave signal.

4. A clock detector according to claim 2, wherein said second saw-tooth wave signal generating means comprises a second time constant sircuit including of a resistor and a capacitor which are connected in series with each other and the resulting series circuit is connected between a power supply terminal ground; and a diode having an anode connected to a common node between said resistor and said capacitor and having cathode coupled for receiving the first clocl pulse signal, said common node being connected to a terminal of said latching means for receiving the second saw-tooth wave signal.

5. A clock detector according to claim 2, further comprising an inverter for receivng the input clock pulse signal to produce an inverted clock; a differentiator delay circuit having a resistor and a capacitor; and a NAND gate for receiving the input clock pulse signal and the delayed pulse from said differentiator and for supplying the first clock pulse signal to said first and second saw-tooth generating means.

* * * * *